(12) United States Patent
Levitan et al.

(10) Patent No.: US 6,460,557 B1
(45) Date of Patent: Oct. 8, 2002

(54) TRANSMISSIONLESS PRESSURE-CONTROL VALVE

(75) Inventors: Jeremy Levitan, Cambridge; Neil Gershenfeld, Somerville; Ernesto Blanco, Belmont, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/697,868

(22) Filed: Oct. 27, 2000

(51) Int. Cl.[7] ............................................... F15B 13/044
(52) U.S. Cl. ..................... 137/1; 137/625.65; 251/129.1
(58) Field of Search ............................ 137/625.65, 1; 251/129.1

(56) References Cited

U.S. PATENT DOCUMENTS

| | | | | |
|---|---|---|---|---|
| 2,967,545 A | * | 1/1961 | Schmidt | 137/625.65 |
| 4,310,143 A | * | 1/1982 | Determan | 137/625.65 X |
| 4,396,037 A | * | 8/1983 | Wilcox | 137/625.65 |
| 5,106,053 A | | 4/1992 | Miller et al. | 251/129.05 |
| 5,251,671 A | * | 10/1993 | Hiroki | 137/625.65 |
| 5,259,414 A | | 11/1993 | Suzuki | 137/625.65 |
| 5,460,201 A | | 10/1995 | Borcea et al. | 137/625.65 |
| 5,479,901 A | * | 1/1996 | Gibson et al. | 137/625.65 X |
| 5,598,871 A | * | 2/1997 | Sturman et al. | 137/625.65 |
| 5,640,987 A | * | 6/1997 | Sturman | 137/625.65 X |
| 5,829,396 A | * | 11/1998 | Sturman et al. | 137/625.65 X |
| 5,937,904 A | * | 8/1999 | Wunder | 137/625.65 |
| 5,992,821 A | * | 11/1999 | Rookes et al. | 251/129.1 |
| 6,105,616 A | * | 8/2000 | Sturman et al. | 137/625.65 |
| 6,345,804 B1 | * | 2/2002 | Martin et al. | 137/625.65 |

* cited by examiner

Primary Examiner—Gerald A. Michalsky
(74) Attorney, Agent, or Firm—Testa, Hurwitz & Thibeault, LLP

(57) ABSTRACT

In a hydraulic or pneumatic flow-control valve, the valve stem itself is made a part of a solenoid arrangement that effects its reciprocation. The valve stem is magnetically responsive (e.g., magnetically permeable or ferromagnetic), and a magnetic field is applied to the stem to cause it to move within the bore of the valve housing; there is no external element required to urge the valve stem into movement. The valve stem is typically sealed permanently within the bore.

14 Claims, 3 Drawing Sheets

TRANSMISSIONLESS PRESSURE-CONTROL VALVE

FIELD OF THE INVENTION

The present invention relates to fluid control systems, and in particular to electromechanical valves for controlling hydraulic and pneumatic equipment.

BACKGROUND OF THE INVENTION

The field of hydraulics involves the movement of fluids—liquids and gases—through systems for various purposes. Hydraulics are used in a wide range of applications including gas-station pumps, control surfaces in aircraft, fuel-injection systems, and theme-park style animatronics. Hydraulic systems require control over inlet pressure and flow to hydraulic components (such as pistons). Because of the high pressures involved, the need for precision, and the desirability of operating over a range of action frequencies, the cost of hydraulic control systems can be quite high. Obtaining reasonable operating bandwidth generally favors the use of hydraulic servovalves, which are the most costly of all.

More generally, a hydraulic control valve is a device that uses mechanical motion to control a source of fluid power. A widely used design is a sliding valve employing a spool-type construction, in which a valve stem having a series of raised portions, or lands, moves within the bore of a cylindrical housing. Radial ports deliver fluid into and conduct fluid from the bore. The stem lands slide along the interior bore surface in the manner of a piston head as the valve stem is reciprocated within the bore, and each land is capable of limiting or completely blocking fluid flow through one of the ports.

Accordingly, the particular combination of inlet and outlet ports operative. at any one time is controlled by the position of the valve stem. If the width (i.e., the axial extent) of the of a land is smaller than the port diameter, the valve is said to have an open center or to be "underlapped." In a "critical center" or "zero-lappex" valve, the land width is identical to the port diameter (a condition approached by practical machining). Closed-center or overlapped valves have land widths that exceed the port diameter.

In hydraulic systems operating in high-pressure, high-flow environments, the valve stem can experience substantial resistance to movement due to pressure differences between inlet and outlet ports. Accordingly, the mechanism used to drive the stem must be capable of generating the necessary force with sufficient speed to accommodate performance requirements. Traditionally, movement of the stem has been accomplished by means of an armature extending from the stem to a drive system disposed outside the housing. This configuration requires a fluid seal, resulting in both high cost and unreliability.

Solenoid-type systems utilize magnetic force to drive the valve stem, and the solenoid elements themselves can be made sufficiently small to fit within an extended housing. Such systems are exemplified by the disclosures of U.S. Pat. Nos. 5,106,053 and 5,460,201. The servovalves disclosed in these patents once again utilize an armature arrangement, but the armature is reciprocated by means of a solenoid contained within the housing. Although such designs avoid the need for fluid seals, they are still fundamentally transmission arrangements: the motive force is generated by an element mechanically distinct from the valve stem, and must be transmitted to the stem by means of a rigid element. As a result, these valves are mechanically complex and costly to manufacture.

DESCRIPTION OF THE INVENTION

Brief Summary of the Invention

In accordance with the present invention, the valve stem itself is made a part of a solenoid arrangement that effects its reciprocation. The valve stem is magnetically responsive (e.g., magnetically permeable or ferromagnetic), and a magnetic field is applied to the stem to cause it to move within the bore of the valve housing; there is no external element required to move the valve stem. The valve stem is typically sealed permanently within the bore.

A coil concentrated or disposed toward one end of the valve housing is capable of drawing the valve stem in that direction. Movement in the opposite direction can be obtained in various ways. In one approach, a second coil is similarly concentrated or disposed toward the opposite end of the valve housing; this coil can act to draw the valve stem or to brake movement effected by the first coil. In another approach, the opposite end of the valve stem is connected to a spring or other means urging the valve stem in the opposite direction. And in still another approach, the valve stem comprises a permanent magnet, and the orientation of the magnetic field applied by a coil is reversed to change the direction of movement.

The valve is useful in both hydraulic and pneumatic applications. In a hydraulic application, the bore in which the valve stem moves is typically filled with hydraulic liquid, the incompressibility of which can also be used as a braking mechanism. For example, the valve housing may comprise one or more ducts extending along the exterior housing surface between two apertures, one leading into the bore and the other leading to a fluid reservoir (e.g., via an outlet vent). A land reciprocates in the vicinity of a duct such that its point of maximum excursion does not reach beyond the aperture into the bore. With the duct open, the valve stem moves freely since fluid between the land and the aperture may be displaced through the duct into the outlet port. If the duct is closed (e.g., by means of a needle valve), on the other hand, the incompressible hydraulic fluid within the bore prevents valve-stem movement.

BRIEF DESCRIPTION OF THE DRAWINGS

The foregoing discussion will be understood more readily from the following detailed description of the invention, when taken in conjunction with the accompanying drawings, in which.

The various elements may not be drawn to scale. Reference numerals differing in their first digits refer to corresponding elements.

DETAILED DESCRIPTION OF THE PREFERRED EMBODIMENTS

Figure 1:
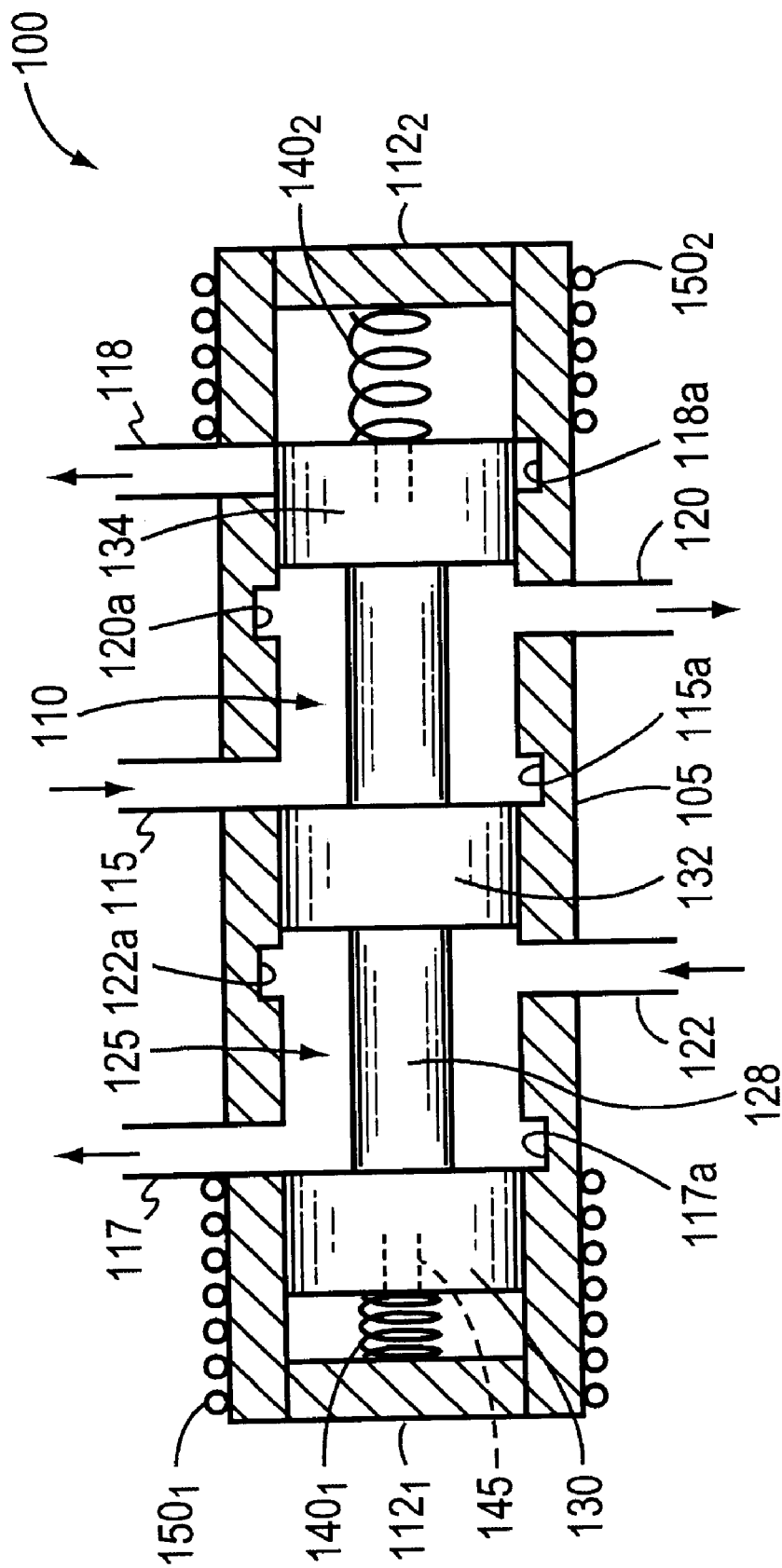
FIG. 1 illustrates a first embodiment of the invention utilizing one or more coils and, if desired, one or more biasing elements.

With reference to FIG. 1, a first valve embodiment indicated generally at 100 includes a nonferrous (e.g., heavy-duty plastic or a nonmagnetic metal) housing 105 having a central cavity or bore 110 therethrough. Bore 110 is capped at both ends of housing 105 by a respective plug or end wall $112_1$, $112_2$. Opening into housing 105 to communicate with bore 110 are a series of radial fluid ports including a supply inlet 115; a pair of exhaust outlets 117, 118; a first operating port 120; and a second operating port 122. In order to maintain a smooth flow of liquid at each of the ports, a series of annular cutouts 115a, 117a, 118a, 120a, 122a may be formed within bore 110.

Movable within bore 110 is a valve stem 125 comprising a shaft 128 and, disposed thereon, a series of lands 130, 132, 134, which fluidly seal against the interior surface of bore 110. Valve stem 125 (or at least the lands 130, 132, 134) may be fabricated from any material that responds to a magnetic field to produce a force, e.g., a magnetically permeable material (such as stainless steel). A first biasing element (e.g., a spring) 140, transmits force to the end face of land 130 to urge valve stem 125 away from end plug $112_1$; and a second biasing element $140_2$ transmits force to the end face of land 134 to urge valve stem 125 in the opposite direction, i.e., away from end. plug $112_2$. As illustrated, land 132 is a critical-center land of axial extent equal to the diameter of port 115; it will be understood, however, that the present invention is applicable to underlapped, zero-lapped, and overlapped valve designs. The axial excursion of valve stem 125 is sufficient to allow lands 130, 132 to clear ports 117, 115 (without blocking port 122) when valve stem 125 moves to the left, and to allow lands 132, 134 to clear ports 115, 118 (without blocking port 120) when valve stem 125 moves to the right. Accordingly, in the operative position as shown in the figure, a first fluid path is created between supply port 115 and first operating port 120; and a second fluid path is created between second operating port 122 and exhaust outlet 117. The net result is to permit hydraulic or pneumatic flow to and from the controlled system.

Figure 3:
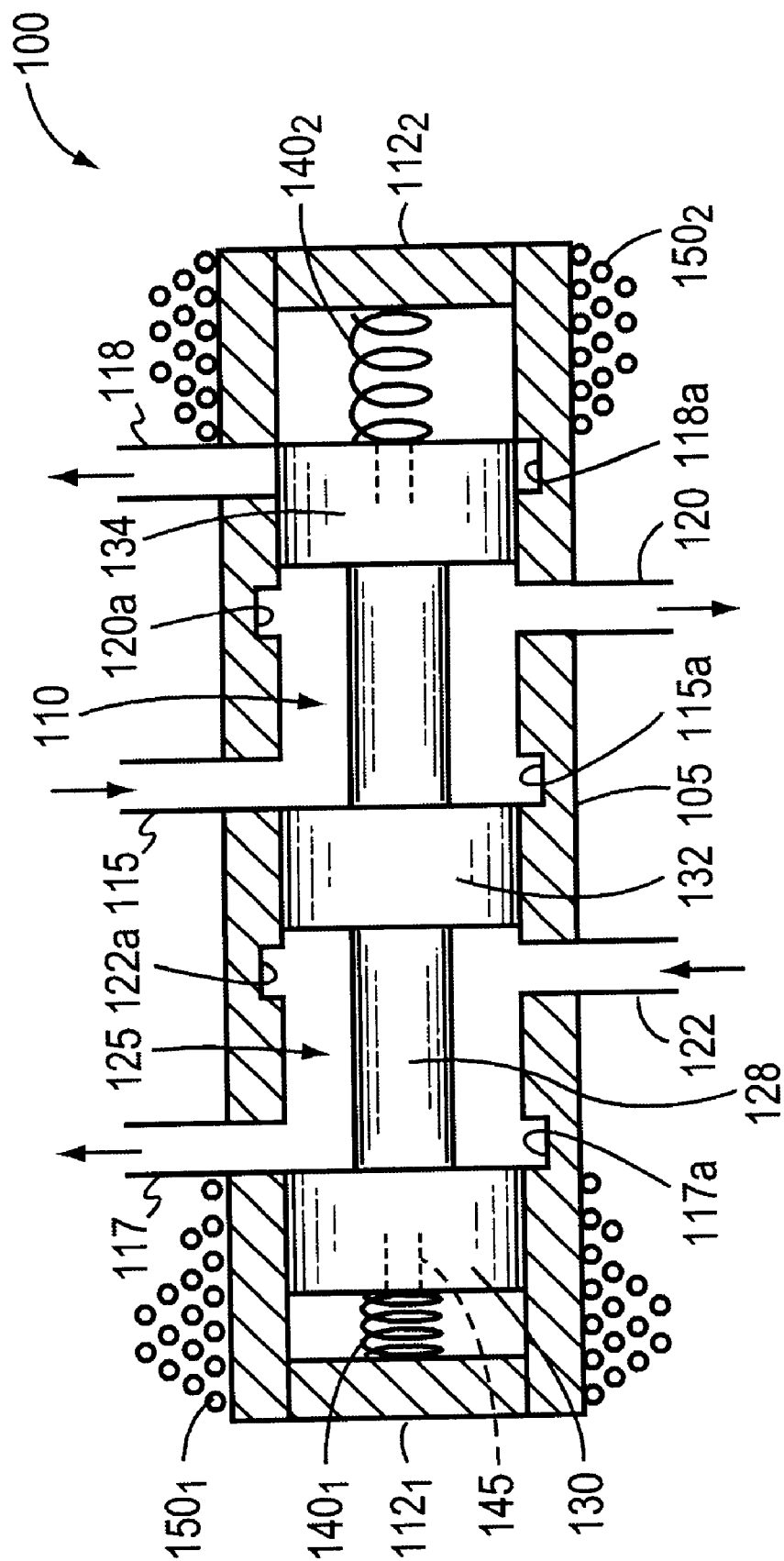
FIG. 3 illustrates a third embodiment of the invention using coils that each have a winding density that increases towards an end of the housing.

A pair of coils $150_1$, $150_2$ is wound around the exterior of housing 105, each in proximity to one of the lands 130, 134. When one of the coils is energized, it acts as a solenoid element to draw its respective land toward its center. As illustrated, the axial extent of each coil $150_1$, $150_2$ completely covers the respective land 130, 134 when draw therein. This configuration is not required, however. For example, the coils may have a longer axial extent (e.g., so as to be more or less coextensive with the full excursions of lands 130, 134) or a shorter extent. Indeed, referring to FIG. 3, the coils may even overlap axially, with each coil 150 having a winding density that increases toward one end of housing 105 to produce a magnetically induced force that matches the load-deflection characteristics of the associated biasing element. Ideally the coil lengths are optimized to provide sufficient force to overcome lateral pressures with a desired operating speed while minimizing heating of housing 105 (which can itself affect hydraulic or pneumatic performance).

The illustrated embodiment, with two coils and two biasing elements, offers maximum obtainable performance: a coil is available to draw the valve stem 125 in either direction, and one biasing element assists the energized coil while the other biasing element acts as a brake to enforce the proper final valve-stem position. But simpler alternatives are possible. For example, the biasing elements $112_1$, $112_2$ may be omitted entirely in favor of raised stops (i.e., annular ridges) within bore 110, in which case the full work of moving valve stem 125 is performed by one or the other coil $150_1$, $150_2$. Alternatively, the valve 100 may include a single coil on one side and a single biasing element on the opposite side. In this case, the biasing element would urge valve stem 125 into one operative position, while the coil, acting against the biasing element, would draw the valve stem into the opposite operative position.

Particularly in the case of a hydraulic valve, it is necessary, in order to permit free movement of valve stem 125 within bore 110, to equalize the pressure at each end of the valve stem (since movement of valve stem 125 expands the interior bore volume at one end of housing 105 and contracts it at the other end). To accomplish this, valve stem 125 may be provided with a central axial bore 145 therethrough, permitting fluid to flow from the contracting end volume to the expanding end volume without entering the fluid paths among the radial fluid ports. The diameter of the valve-stem bore is chosen so as to allow free movement of the valve stem while providing some beneficial damping. The valve-stem bore may omitted in some pneumatic designs, however, since gas compression in the contracting end volume, if not excessive, can actually provide a desirable biasing force.

An alternative approach is to cut axial grooves into the outer surfaces of the lands 130, 134 to permit leakage throughout the interior of bore 110 on each side of land 132. In this case, the grooves must be circumferentially located so as not to interfere with the ability of the lands to seal ports 117, 118.

Various features can be added to lands 130, 132, 134 to enhance valve performance. For example, the land edges may be chamfered, and the joints where shaft 128 meets the lands may be radially tapered. The overall design affords simple and inexpensive manufacture. The housing 105 may be injection molded and precision reamed for a hydraulic sliding fit. The valve stem 125, which is typically precision machined, is introduced into the bore of housing 105, following which the end caps $112_1$, $112_2$ are affixed. The coils 150 are then simply wound over the exterior surface of housing 105.

Figure 2:
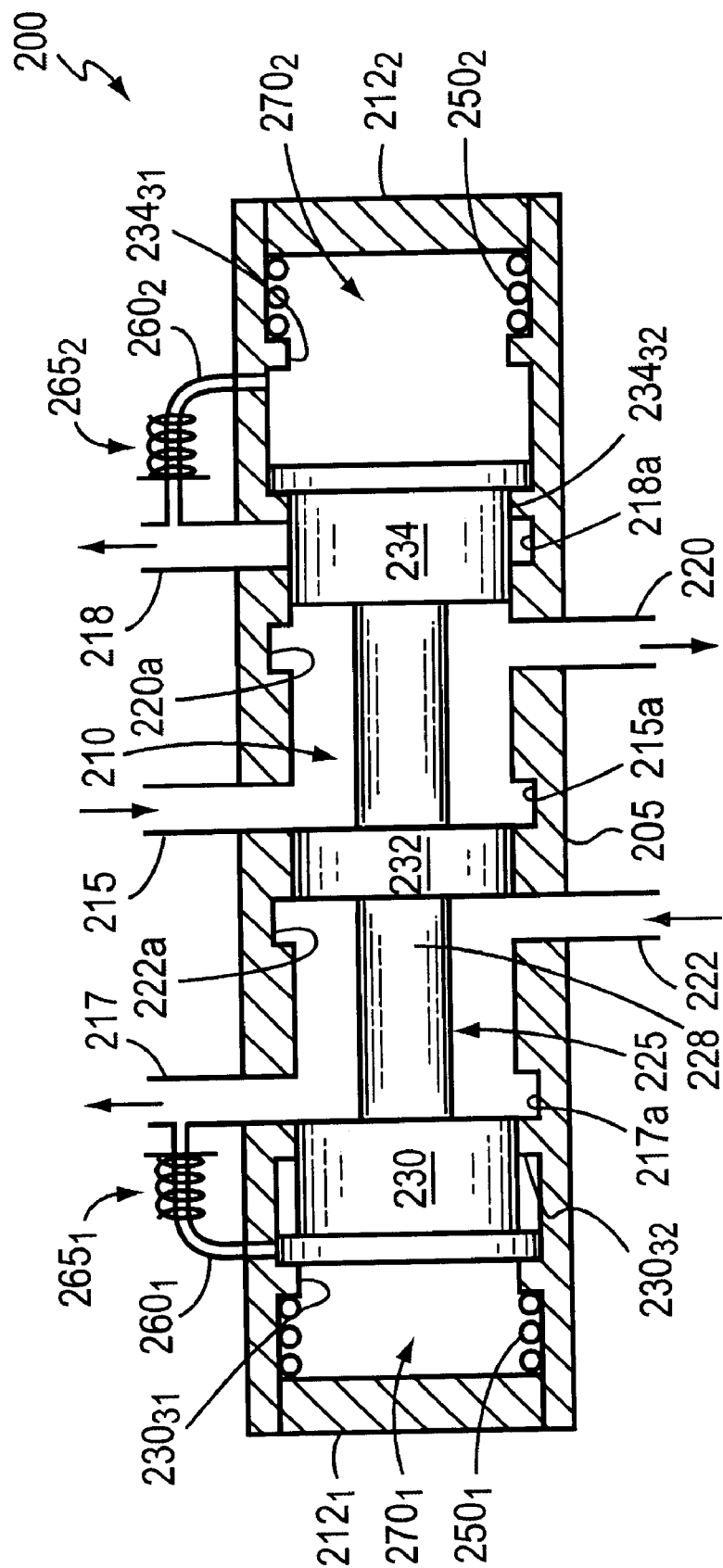
FIG. 2 illustrates a second embodiment of the invention using a duct arrangement for braking purposes.

With reference to FIG. 2, an alternative embodiment 200 once again includes a housing 205 having a central bore 210 therethrough. Bore 210 is capped at both ends of housing 205 by a respective plug or end wall $212_1$, $212_2$. Radial fluid ports 215, 217, 218, 220, 222 communicate with bore 210, and annular cutouts 215a, 217a, 218a, 220a, 222a may be formed within bore 210. The valve stem 225 comprises a shaft 228 and a series of lands 230, 232, 234. In this embodiment, however, the outer ends of lands 230, 234 are flared into flanges that fluidly seal against the interior surface of bore 210 and are movable between respective pairs of stop ridges $230_{s1}$, $230_{s2}$ and $234_{s1}$, $234_{s2}$. Coils $250_1$, $250_2$ are disposed within the housing 205 (between end cap $212_1$, and stop $230_{s1}$ on one side, and between end cap $212_2$ and stop $234_{s1}$, on the other side). A pair of ducts $260_1$, $260_2$ open into bore 210, each duct leading, respectively, from a point just axially inward of stop $230_{s1}$, $234_{s1}$ to exhaust outlet 217, 218. Each duct $260_1$, $260_2$ has a respective electromechanically operated needle valve $265_1$, $265_2$ capable of shutting fluid flow through the duct. For example, the needle valves may be operated by means of solenoids or a galvanometers.

In operation, energizing one of the coils $250_1$, $250_2$ draws the respective land 230, 234 theretoward until contact is made with stop ridge $230_{s1}$, $234_{s1}$. As this occurs, one of the end volumes $270_1$, $270_2$ expands and the other contracts. Fluid is forced from the contracting volume through the duct $260_1$, $260_2$ in communication therewith and ejected into one of the exhaust outlets 217, 218, while fluid is drawn from the other exhaust outlet through the other duct to fill the expanding end volume. In the case of a hydraulic system, shutting either or, preferably, both ducts $260_1$, $260_2$ (by means of the needle valves $265_1$, $265_2$) locks valve stem 225 into the current position; movement is prevented by the incompressibility of the hydraulic fluid. The result is high stiffness against motion without the need for continued application of power to either or both of the coils.

With coils $250_1$, $250_2$ disposed at the termini of bore 210, it is preferred to use a magnetically permeable material for housing 205 in order to concentrate the magnetic field within bore 210. Lands 230, 234 may be magnetically permeable or, instead, permanent magnets. In the latter case, shaft 228 is nonmagnetic and the direction in which coils $250_1$, $250_2$ are energized is obviously important; by energizing the coils in opposite directions, performance may be improved in that one land will be drawn and the other repelled in the same axial direction. In this regard, the coils may be oppositely wound or driven by oppositely directed currents.

It should be stressed that the above-described coil arrangements are interchangeable and not specific to either embodiment. That is, the end-placed coil arrangement shown in FIG. 2 is equally applicable to the first embodiment shown in FIG. 1, while the exterior coil arrangement of FIG. 1 may be used in conjunction with the second embodiment.

Although the present invention has been described with reference to specific details, it is not intended that such details should be regarded as limitations upon the scope of the invention, except as and to the extent that they are included in the accompanying claims.

What is claimed is:

1. A fluid-control valve comprising:
   a. a non-magnetic elongated housing comprising (i) exterior and interior surfaces, the interior surface forming a central bore, and (ii) a series of radial ports through the exterior surface and communicating with the bore;
   b. within the housing bore, a magnetically-responsive valve stem comprising a plurality of lands and capable of reciprocation within the bore, each of the lands comprising a sealing surface configured for placement against the interior surface of the bore for forming a fluid seal and at least partially blocking a port;
   c. a coil associated with the exterior surface of the housing and configured to produce a magnetic field applied to a land so as to transmissionlessly draw the stem in a first direction; and
   d. means for drawing the stem in a second direction opposite the first direction.

2. The valve of claim 1 wherein the drawing means is a biasing element.

3. The valve of claim 2 wherein the biasing element is another coil associated with the housing and producing a magnetic field drawing the stem in the second direction.

4. The valve of claim 3 wherein the coils are disposed along the exterior surface of the housing, the housing being nonmagnetic.

5. The valve of claim 4 wherein the housing has first and second axial portions, the coils being axially separated from each other, each of the coils extending axially only along a respective one of the housing portions.

6. The valve of claim 5 wherein energizing of either of the coils draws one of the lands into an interior region defined by the energized coil, each of the coils having an axial extent sufficient to completely cover a land when drawn into the interior region.

7. The valve of claim 4 wherein the the coils overlap axially, each coil having a winding density that increases toward an end of the housing.

8. The valve of claim 7 wherein the winding density is selected such that the coil, when energized, produces a magnetically induced force balancing the drawing means.

9. The valve of claim 1 wherein the bore is sealed at each end thereof and comprises a fluid therein, the valve stem comprising means facilitating fluid leakage within the bore so as to permit movement of the valve stem therein, said means not interfering with fluid sealing of the ports.

10. The valve of claim 1 wherein the valve stem is magnetically permeable.

11. A method of controlling fluid flow, the method comprising the steps of:
   a. providing a non-magnetic elongated housing comprising: (i) exterior and interior surfaces, the interior surface forming a central bore, and (ii) a series of radial ports through the exterior surface and communicating with the bore,
   b. disposing, within the housing bore, a magnetically responsive valve stem comprising a plurality of lands and capable of reciprocation within the bore, each of the lands comprising a sealing surface configured for placement against the interior surface of the bore for forming a fluid seal and at least partially blocking a port;
   c. providing a coil associated with the exterior surface of the housing and configured to produce a magnetic field applied to a land so as to transmissionlessly draw the stem in a first direction; and
   d. operating the coil to apply a magnetic field directly to a land so as to transmissionlessly draw the stem in a first direction to establish a desired flow path between the ports.

12. The method of claim 11 further comprising the step of drawing the stem in a second direction opposite the first direction.

13. The method of claim 11 wherein the drawing step is accomplished by applying a second magnetic field.

14. The method of claim 11 wherein the bore is sealed at each end thereof and comprises a fluid therein, and further comprising the step of facilitating fluid leakage within the bore so as to permit movement of the valve stem therein without interfering with fluid sealing of the ports.

* * * * *